United States Patent Office 3,351,480
Patented Nov. 7, 1967

3,351,480
STARCH-REMOISTENING ADHESIVE COMPOSITION
Merle J. Mentzer, Mokena, Ill., assignor to Corn Products Company, New York, N.Y., a corporation of Delaware
No Drawing. Filed Apr. 2, 1965, Ser. No. 445,274
7 Claims. (Cl. 106—210)

ABSTRACT OF THE DISCLOSURE

An improved starch remoistening adhesive composition is obtained by slurrying ungelatinized, chemically modified starch in water, adjusting the pH to at least 8, preferably 10, and heating the slurry sufficiently to gelatinize the starch. Suitable starches include those which are free of set back after gelatinization. The adhesive, after application to a substrate and after remoistening, exhibits improved open time and improved bond time.

---

The present invention relates to the preparation of an adhesive composition suitable for use as a remoistening adhesive which possesses improved open time and improved bond time.

The term "remoistening adhesive composition" as employed herein pertains to an adhesive which is applied to a material such as paper or fabric as a coating and dried. Upon moistening, the adhesive composition rapidly develops tackiness and acts as a binding agent for bonding the coated material to another material. Examples of uses of a remoistening adhesive include gummed labels, gummed tape, and the like.

Certain criteria are used by industry to determine the qualities of a remoistening adhesive composition. Some of these criteria include open time, bond time, blocking characteristics, wet curl, dry curl, gloss, etc. Two of the most important qualities of a remoistening adhesive composition are its bond time and open time.

Bond time is the minimum time necessary to develop a fiber tearing bond after remoistening and applying the adhesive coated material to a substrate. Open time refers to the maximum time that a remoistened adhesive can be held before applying and still produce a fiber tearing bond. Ideal remoistening adhesives have both a short bond time and a long open time.

Many previous attempts to increase the open time, while simultaneously decreasing the bond time, have been unsatisfactory, primarily because these two properties are closely related to the solubility of the adhesive film. It is generally found that by increasing the open time, the bond time also is increased and conversely, by decreasing the bond time the open time also is decreased. Heretofore, it has not been possible to produce a remoistening adhesive having an increase in open time while simultaneously maintaining or reducing the bond time.

It is an object of the present invention to increase the open time of a remoistening adhesive composition while simultaneously decreasing the bond time.

It is another object of the present invention to provide a process for preparing an adhesive formulation suitable for use as a remoistening adhesive having improved characteristics.

It is another object of the present invention to provide a remoistening adhesive composition having improved blocking characteristics.

Other objects of the present invention will be apparent from the following description.

The present invention provides a process for the preparation of an adhesive composition which comprises admixing ungelatinized, chemically modified starch, the starch being substantially free of set back after gelatinization in water, a plasticizer, and water in proportions such that the ratio of starch to plasticizer exceeds about 2:1, and the resulting mixture contains between about 30% and about 70% solids, adjusting the pH of the mixture to between about 8 and about 12, and heating the mixture to a temperature sufficient to substantially gelatinize the starch.

Further, the present invention provides a novel adhesive composition, suitable for use as a remoistening adhesive, which comprises ungelatinized, chemically modified starch, the starch being substantially free of set back after gelatinization in water, a plasticizer, and water in proportions such that the ratio of starch to plasicizer exceeds about 2:1, and that the mixture of these components contains between about 30% and about 70% solids, said mixture having a pH between about 8 and about 12 and having been heated to a temperature sufficient to substantially gelatinize the starch.

In addition, the present invention provides an adhesive composition which in addition to the starch, plasticizer, and water contains an adjunct selected from the group consisting of animal glue, dextrin, and a combination thereof. The adjunct is present in an amount up to about 25%, by weight, of the adhesive composition, preferably less than about 10%, by weight. The ratio of the starch and adjunct combined, to the plasticizer exceeds about 2:1, preferably about 4:1.

The present invention is based upon the discovery that the open time is increased while the bond time simultaneously is decreased in a remoistening adhesive composition, which contains an ungelatinized, chemically modified starch, by adjusting the pH of the adhesive composition mixture to between 8 and 12, and heating the mixture in order to gelatinize the starch. It is not known, with certainty, why adjustment of the pH of the adhesive mixture to between 8 and 12 provides an improved open time as well as an improved bond time.

In a specific embodiment, acid modified waxy milo starch in the amount of 37%, by weight, is admixed with 10% urea, 5% animal glue and 48% water. All percentages are by weight. The pH of the resulting mixture is adjusted to 10.0 with 10% aqueous sodium hydroxide. The mixture is heated to 195° F., and maintained at that temperature for 15 minutes. The resulting adhesive composition is ready for application to its substrate, i.e. paper, fabric, or the like. Generally, in commerical operations, remoistening adhesive compositions are applied at a temperature of approximately 150° F. Optionally, the pH of the adhesive mixture of the present invention may be adjusted to a neutral pH, or any pH desired, after heating, without loss of the improved characteristics.

Suitable starches for use in the present invention are ungelatinized, chemically modified starches being substantially free of set back after gelatinization in water. Different types of starch are suitable for use in the present invention, for instance, cereal starches such as corn, grain sorghum, and wheat, waxy starches such as waxy milo and waxy maize, and root starches such as potato starch and tapioca starch. It is necessary for a starch from any of these three species to be chemically modified to substantially eliminate the set back properties of the starch. Without the proper modification, the starch component would gel or become viscous after gelatinization of the starch. This property of an unmodified starch is referred to in the art as "set back." Hence, it is necessary in the present invention to chemically modify the starch to achieve stability of the starch against set back. In other words, the starch component must remain in liquid form in the final adhesive composition prior to application to its substrate.

Cereal starch may be modified by derivatization to achieve stability against set back. Suitable starch derivatives include starch ethers and starch esters.

Waxy starch is preferably subjected to simple chemical modification of the starch such as acid modification, oxidation, enzyme modification or the like to render the starch suitable for use in the present invention.

Some of the root starches are rendered suitable for use in the present invention by chemical modification such as acid modification, oxidation or the like. Other root starches may require a degree of derivatization to be rendered suitable for use in the present invention.

The term "ungelatinized, chemically modified starch" as used herein, includes all of the starches and their modified forms discussed above as well as their equivalents.

Further modification of the ungelatinized, chemically modified starch defined above may be effected if desired without altering the acquired property of the starch to be stable against set back.

Suitable plasticizers include sorbitol, sodium nitrate, urea, and other known plasticizing agents.

The order in which the components of the adhesive composition are admixed is not significant. For example, one may wish to disperse the starch component in water and then add the plasticizer and, if desired, the animal glue or dextrin before adjusting the pH and elevating the temperature of the mixture. Similarly, it may be desirable to admix the starch and water and, if desired, the animal glue or dextrin component, adjust the pH and heat the mixture to gelatinize the starch prior to the addition of the plasticizer.

The pH is adjusted to between about 8 and about 12, preferably about 10. Generally, it is preferred to effect the adjustment of the pH of the mixture after all components have been admixed. Preferably, the pH is adjusted and then the temperature of the mixture is elevated to that sufficient to substantially gelatinize the starch. The mixture is preferably held at this elevated temperature for a period of time sufficient to gelatinize substantially all of the starch present.

The adhesive composition when ready for application contains about 30% to about 70% solids by weight, preferably, between about 40% and about 60% solids by weight.

The solid components are present in a proportion such that the ratio of the starch component to the plasticizer exceeds about 2:1, and preferably is in the range of between about 4:1 and about 10:1. Optionally, an adjunct selected from the group consisting of animal glue, dextrin and a combination thereof, may be added in an amount such that the ratio of the starch component combined with the adjunct to the plasticizer exceeds about 2:1, and preferably is between about 4:1 and about 10:1.

The examples demonstrate the improved characteristics of the remoistening adhesive composition of the present invention when used to manufacture a gummed paper tape.

Definitions for the terms "bond time" and "open time" were presented above. The data for the bond time are obtained as follows: At least 5 strips of tape, 9 inches long, are cut from the first, middle, and last portions of the prepared tape. A strip is remoistened by means of a gummed tape dispenser generally used by a consumer. At the same time, a stop watch is activated. When 5 seconds have elapsed, the tape is laminated to the smooth side of of a heavy caliper chipboard using uniform hand pressure. The tester then immediately begins delaminating the tape at a moderately slow rate pulling at a right angle to the surface. When 80-100% fiber tear occurs the stop watch is stopped. The total elapsed time, in seconds, is reported as the bond time. This represents the shortest time necessary for the tape to develop 80-100% fiber tear after an open time of 5 seconds. A short time represents a fast bond development. A series of at least 5 strips are run and the results averaged.

The data presented for the open time are obtained as follows: At least 3 sets of tape strips, 5 inches long by 2 inches wide, are cut from the first, middle, and last portions of the prepared tape. Each tape set should contain 8 strips which are used to evaluate open time of 5 to 40 seconds in 5 second increments. The test is run in the following manner: Remoisten the strip of tape through the gummed tape dispenser, generally used by a consumer, and activate a stop watch at the same time. After 5 seconds have elapsed, laminate the strips to the smooth side of a heavy caliper chipboard using hand pressure to insure complete uniform contact. Fold back about one-half inch to facilitate removal later. Repeat, using elapsed times of 10, 15, 20, 25, 30, 35 and 40 seconds. Allow the laminated tape to dry for 2 hours, and carefully pull each tape strip from the board at a uniform rate of speed. Note the first strip (the shortest elapsed time) which does not exhibit 100% fiber tearing development. The complete series is run at least 3 times and the average maximum time which still results in 100% fiber bond is reported.

Blocking is defined as that degree of cohesion or adhesion between contiguous layers of gummed papers which interferes with free removal of one sheet without disturbing the surface of another. For instance, a roll of gummed paper stored under relatively high humidity conditions may stick in such a manner that the gummed paper or tape is virtually unusable. Minimal blocking is important to an acceptable remoistening adhesive composition. The test procedure for obtaining the data on the blocking characteristics of the adhesive formulation is as follows: Eight specimens, 1 inch by 3 inches, for each sample are cut. One end of each strip is marked with a sample designation. The samples are fanned open, one from another, to permit open exposure. The exposed samples are left in open form for 6 hours in either 75% or 85% relative humidity at room temperature of about 73° F. After 6 hours the strips are stacked, one over the other, gummed side down, and in register. The stack is then placed on a glass plate in the same humidity chamber in which it was conditioned, wth a 4 pound weight on the stack evenly distributed over a 2 inch by 1 inch area. The one inch section without weight should be the marked end, freely available at the end of the test to evaluate the degree of bonding in the area subjected to load. The stack is kept under a constant load of 2 p.s.i. at the pre-selected conditions of relative humidity and temperature for 18 hours. After this time period, the weight is removed while the relative position of each strip in the stack is maintained. The stack is removed from the humidity chamber and conditioned for 4 hours at about 50% relative humidity at room temperature. Then, one by one, each strip is removed and rated according to the following scale:

| | |
|---|---|
| 0 | No blocking (strips separated easily). |
| 1 | Sticking, but no fiber tear. |
| 2 | 0–25% fiber tear. |
| 3 | 25–50% fiber tear. |
| 4 | 50–75% fiber tear. |
| 5 | 75–100% fiber tear. |

Thus, the lower number of the rating scale indicate superior qualities of the adhesive formulation.

In the following operating examples, which clearly illustrate the invention, all percentages are by weight and all temperatures are in degrees Fahrenheit. All times, such as open time and bond time, are presented in seconds.

EXAMPLE I

Three formulations, designated below as A, B and C, were prepared. In each formulation the starch component was acid modified waxy milo starch with a Scott viscosity at 75 grams of 40 seconds. In the preparation of formulation A the plasticizer, i.e., urea, was added after the heating step was complete. In the preparation of formulations B and C, the plasticizer was added before the heating step began. In the preparation of each formulation the components were mixed and the pH of the resulting mixture adjusted or not as indicated in Table I. After the mixing, whether or not the pH was adjusted, the adhesive composition was heated to a temperature of 195° F. for 15 minutes. The composition was then cooled to 150° F., whereupon it was applied for the testing and the test results then obtained. All results are set forth in Table I.

Formulation A:
                  Percent
 Starch component _____ 44
 Urea _____ 6
 Water _____ 50

Formulation B:
 Starch component _____ 37
 Urea _____ 10
 Animal glue _____ 5
 Water _____ 48

Formulation C:
 Starch component _____ 32
 Urea _____ 10
 Animal glue _____ 5
 Dextrin _____ 5
 Water _____ 48

TABLE I

|  | A | | | B | | | C | | |
| --- | --- | --- | --- | --- | --- | --- | --- | --- | --- |
| pH before heating | 4.6 | 8.0 | 10.0 | 6.7 | 10.0 | 10.0 | 5.3 | 10.0 | 10.0 |
| pH after heating | 7.5 | 8.9 | 10.2 | 6.4 | 8.8 | 8.8 | 5.9 | 8.8 | 8.8 |
| pH after readjustment (if any) | | | | | | 6.7 | | | |
| Bond time, seconds | 27 | 26 | 20 | 27 | 17 | 14 | 26 | 25 | 5.3 24 |
| Open time, seconds | 7 | 15 | 15 | 20 | 23 | 25 | 25 | 23 | 25 |
| Blocking characteristics rating at— | | | | | | | | | |
|  85% R.H.* | | | | 3 | 1 | 2 | 5 | 2 | 3 |
|  75% R.H.* | | | | 0 | 0 | 0 | 2 | 0 | 0 |

* R.H.—Relative humidity.

It will be noted in each instance in Table I above, that the bond time was decreased, the open time increased, and/or the blocking characteristics improved, upon the adjustment of the pH to 8 or 10.

EXAMPLE II

This example illustrates the effect of pH on the bond time and open time of the following formulation:

Percent
Acid modified waxy milo starch [1] _____ 43
Urea _____ 2
Water _____ 55

[1] 75 gm. Scott viscosity 40 seconds.

In each test (1–4), the constituents were mixed and the pH was adjusted prior to heating the mixture to above 195° F. for 15 minutes.

TABLE II

|  | 1 | 2 | 3 | 4 |
| --- | --- | --- | --- | --- |
| pH before heating | 4.5 | 8.2 | 10.0 | 11.8 |
| pH after heating | 5.1 | 9.0 | 9.4 | 10.4 |
| Bond time | 23 | 16 | 13 | 11 |
| Open time | 5 | 10 | 10 | 15 |

EXAMPLE III

This example illustrates the applicability of the present invention to adhesive compositions having a broad range of solids content.

In the preparation of each formulation below the constituents were mixed, and in those tests wherein the pH was adjusted, the adjustment took place prior to heating the mixture at 195° F. for 15 minutes.

|  | D (percent) | E (percent) |
| --- | --- | --- |
| Acid modified waxy milo starch* | 28 | 49 |
| Urea | 2 | 21 |
| Water | 70 | 30 |

TABLE III

|  | D | | E | |
| --- | --- | --- | --- | --- |
| pH prior to heating | 4.8 | 10.5 | 7.6 | 11.0 |
| pH after heating | 6.0 | 9.5 | 8.2 | 9.2 |
| Bond time | 8 | 5 | 105 | 90 |
| Open time | 8 | 10 | 30 | 30 |

*75 gm. Scott viscosity 40 seconds.

EXAMPLE IV

This sample illustrates the use of a root starch, a waxy maize starch, and a starch derivative in the present invention. In formulations F, G and H below all of the constituents were admixed with water at 77° F. and the pH was recorded. In those tests wherein the pH was adjusted to exceed 8, the adjustment was made prior to heating the mixture to 195–200° F. The mixture was held at the elevated temperature for 15 minutes after which it was cooled to 150° F. for application to the substrate. Application of the adhesive composition and all tests were conducted as in Example I.

F

Percent
Oxidized potato starch [1] _____ 45
Sodium nitrate _____ 5
Water _____ 50

G

Hydroxyethyl grain sorghum starch [2] _____ 45
Urea _____ 5
Water _____ 50

H

Acid modified waxy maize starch [3] _____ 40
Urea _____ 5
Dextrin _____ 10
Water _____ 45

[1] 100 gm. Scott viscosity 40 seconds.
[2] Degree of substitution 0.07 and 100 gm. Scott viscosity 75 seconds.
[3] 100 gm. Scott viscosity 38 seconds.

TABLE IV

|  | F | | G | | H | |
| --- | --- | --- | --- | --- | --- | --- |
| pH before heating | 5.1 | 10.0 | 7.4 | 10.0 | 5.0 | 10.0 |
| pH after heating | 5.1 | 8.4 | 7.8 | 8.4 | 7.8 | 8.8 |
| Bond time | 11 | 6 | 11 | 9 | 20 | 17 |
| Open time | 10 | 15 | 10 | 12 | 7 | 13 |

EXAMPLE V

This example illustrates the utility of different plasticizers in the present invention. In this formulation the plasticzer was added after the pH was adjusted and the mixture had been heated at 195° F. for 15 minutes.

| | Percent |
|---|---|
| Acid modified waxy milo starch [1] | 44 |
| Sodium nitrate | 6 |
| Water | 50 |

[1] 75 gm. Scott viscosity 40 seconds.

TABLE V

| | | |
|---|---|---|
| pH before heating | 4.7 | 9.0 |
| pH after heating | 4.7 | 8.8 |
| Bond time | 25 | 23 |
| Open time | 5 | 10 |

In the same formulation sorbitol was substituted for the sodium nitrate. Substantially the same results as above were obtained.

While the invention has been described with reference to certain specific embodiments thereof, it is intended that such matters be purely illustrative for the purpose of describing the invention, and the invention is in no sense considered limited thereto. Numerous modifications and equivalents of the present invention will be apparent to those skilled in the art.

I claim:

1. A process for the preparation of an adhesive composition which comprises admixing ungelatinized starch chemically modified to such an extent that the starch is substantially free of set back after gelatinization in water, a plasticizer, and water in proportions such that the ratio of starch to plasticizer exceeds about 2:1, and the resulting mixture contains between about 30% and about 70% solids by weight, adjusting the pH of the resulting mixture to between about 8 and about 12, and heating the mixture to a temperature sufficient to substantially gelatinize the starch.

2. A process for the preparation of an adhesive composition which comprises admixing ungelatinized starch chemically modified to such an extent that the starch is substantially free of set back after gelatinization in water, a plasticizer, and water in proportions such that the ratio of starch to plasticizer exceeds about 4:1 and the resulting mixture contains between about 40% and about 60% solids by weight, adjusting the pH of the mixture to about 10, and heating the mixture to a temperature sufficient to substantially gelatinize the starch.

3. A process for the preparation of an adhesive composition which comprises admixing ungelatinized starch chemically modified to such an extent that the starch is substantially free of set back after gelatinization in water, a plasticizer, an adjunct selected from the group consisting of animal glue, dextrin, and a combination thereof, and water in proportions such that the ratio of starch and adjunct combined to plasticizer exceeds about 2:1, and the resulting mixture contains between about 30% and about 70% solids by weight, adjusting the pH of the mixture to between about 8 and about 12, and heating the mixture to a temperature sufficient to substantially gelatinize the starch.

4. A process for the preparation of an adhesive composition which comprises admixing acid modified waxy milo starch, urea, animal glue, and water in proportions such that the ratio of starch and animal glue combined to urea is at least about 2:1, and the resulting mixture contains between about 30% and about 70% solids by weight, adjusting the pH of the mixture to between about 8 and about 12, and heating the mixture to a temperature sufficient to substantially gelatinize the starch.

5. A composition suitable for the preparation of a remoistening adhesive, comprising an ungelatinized starch chemically modified to such an extent that the starch is substantially free of set back after gelatinization in water, a plasticizer, and water in proportions such that the ratio of starch to plasticizer exceeds about 2:1, and the composition contains between about 30% and about 70% solids by weight, said composition having a pH between about 8 and about 12.

6. A composition suitable for the preparation of a remoistening adhesive, comprising ungelatinized starch chemically modified to such an extent that the starch is substantially free of set back after gelatinization in water, a plasticizer, and water in proportions such that the ratio of starch to plasticizer exceeds about 4:1, and the composition contains between about 40% and about 60% solids by weight, said composition having a pH of about 10.

7. A composition suitable for the preparation of a remoistening adhesive, comprising ungelatinized starch chemically modified to such an extent that the starch is substantially free of set back after gelatinization in water, a plasticizer, an adjunct selected from the group consisting of animal glue, dextrin, and a combination thereof, and water in proportions such that the ratio of starch and adjunct combined to plasticizer exceeds about 2:1, and the composition contains between about 30% and about 70% solids by weight, said composition having a pH between about 8 and about 12.

References Cited

UNITED STATES PATENTS

| 2,188,329 | 1/1940 | Bauer et al. | 106—213 |
| 2,791,512 | 5/1957 | Hatch et al. | 106—208 |
| 2,885,374 | 5/1959 | Sweeney | 106—130 |
| 2,997,404 | 8/1961 | Roberson et al. | 106—213 |
| 3,222,199 | 12/1965 | Hickey | 106—213 |

ALEXANDER H. BRODMERKEL, *Primary Examiner.*

T. MORRIS, *Assistant Examiner.*